United States Patent

[11] 3,619,545

| | | |
|---|---|---|
| [72] | Inventor | Rolland Ernest Borden<br>Inglewood, Calif. |
| [21] | Appl. No. | 806,433 |
| [22] | Filed | Mar. 12, 1969 |
| [45] | Patented | Nov. 9, 1971 |
| [73] | Assignee | McCulloch Corporation<br>Los Angeles, Calif. |

[54] HARD FACING MACHINE
12 Claims, 13 Drawing Figs.

[52] U.S. Cl.............................................. 219/77,
219/124, 219/130
[51] Int. Cl..................................................... B23k 9/04
[50] Field of Search............................................ 219/76, 77,
125, 124; 314/113, 69

[56] References Cited
UNITED STATES PATENTS
2,717,569  9/1955  Osterman et al.............. 219/124 X
1,957,489  5/1934  Comstock ..................... 219/124
2,729,578  1/1956  Hedlund et al. .............. 219/76

*Primary Examiner*—J. V. Truhe
*Assistant Examiner*—J. G. Smith
*Attorney*—Christie, Parker and Hale

ABSTRACT: Hard facing is applied to the end of a workpiece in the form of a chain saw blade by a heliarc torch while the blade is traversed twice and rotated between traverses. The traverses are produced by a table which is moved on a base. Rotation is effected by a motor mounted on the table. A control circuit determines the initiation and termination of the traverses and rotation at predetermined points in the hard face application cycle and during a return cycle. Weld wire is positively advanced into the welding zone by a weld wire feed assembly. A clamp holds the workpiece blade during the hard facing application. The torch, being carried with the weld wire feed assembly, is maintained in proper relationship to the workpiece by a cam which moves in index with the workpiece.

HARD FACING MACHINE

BACKGROUND OF THE INVENTION

The present invention relates to the art of welding and, more in particular, to a welding machine suitable for use in applying hard facing to workpieces having a profile to be welded which includes linear portions as well as curved portions.

Hard facing must be applied to blades for chain saws. The hard facing is applied around the nose of the blade on which the chain tracks to promote better wear characteristics, inasmuch as it is this area which is subject to considerable wearing by the chain as a cut is made. The nose of the blade has a generally circular tip and two straight, slightly diverging portions extending from the tip.

The application of hard facing to the nose has generally been done by hand. This has proven unsatisfactory in many respects. Most hand welding is done with a gas torch which, when compared to arc welding, is slower, uses more welding rod, and results in a weld having considerably more porosity. It is difficult, for example, to maintain the welding torch to workpiece distance in hand welding which is necessary to produce a uniform weld. But perhaps the biggest drawback in hand welding is the amount of time required to hard face each blade.

It is therefore highly desirable to provide a welding machine to hard face the nose of chain saw blades.

An effective welding machine must be adapted to handle different size saw blades. The weld rod must be advanced into the weld zone in such a manner that different sized workpieces are accommodated and the course of the weld over the entire weld area is accurately followed by the weld rod. The machine must maintain proper welding torch to blade position throughout the entire weld cycle, for proper welding torch to blade position is necessary to maintain a constant arc between the blade and the torch electrode.

The requirement of weld rod feed into the welding zone at the proper rate and in proper position dictates a positive and coordinated feed. At the completion of a weld, furthermore, the weld rod must be backed out of the welding zone to prevent rod sticking.

It is also, of course, necessary to provide a welding machine which is easily setup and which effects its hard face application at a rapid rate. Thus, provision must be made to rapidly mount and dismount workpieces. Provision must also be made to accommodate the welding machine to a variety of different blade sizes rapidly.

SUMMARY OF THE INVENTION

The present invention provides a flexible welding machine which translates or traverses and rotates the workpiece being welded in proper relationship with respect to its welding torch and which accurately feeds weld rod into the welding zone.

In one form, the present invention contemplates a welding machine having a base and a translatable table on the base. Means is provided, such as a screw and nut drive driven by a motor, to translate the table at predetermined intervals during the welding cycle. Means on the table, such as a motor, is provided to rotate the workpiece at a predetermined point during a predetermined interval of the welding cycle. The workpiece is held by mounting means to rotate and translate with the table and rotational means respectively. Means is also provided to maintain a welding torch in proper position relative to the workpiece being welded. A weld rod feed assembly is provided to advance the weld rod into the welding zone.

A more particular form of the present invention contemplates a quick disconnect type of holding means for mounting the workpiece. Such means may be in the form of a spring actuated clamp which positively urges the workpiece between the clamp and a complementary bearing surface. The weld rod feed preferably has means to positively engage the weld rod during its advancement and consumption in the welding zone. Such means may be in the form of a nut and screw driven by a conventional motor and a clamp actuated by, for example, an air cylinder. The weld rod feed and the welding torch are mounted on a carriage which is responsive to a cam for proper orientation with respect to the workpiece. The cam, in turn, is responsive to the translation and rotation means. The cam has a profile corresponding to the profile of the workpiece to be welded.

The present invention provides a welding machine which is capable of applying a hard facing to different size blades at a relatively rapid rate in a relatively simple manner. By providing a carriage for a weld rod feed assembly which is pivoted to a frame and which also carries the welding torch, the correct torch and weld rod position for different size blades is readily obtained and maintained for the entire length of a weld. Coordinated linear and rotational positioning of the workpiece with respect to the weld rod and torch also ensures proper hard face application throughout the length of the welded profile of a blade. Positively restraining the weld rod while advancing it at a predetermined rate also enchances weld characteristics inasmuch as the weld rod is always maintained in proper position relative to the welding zone. The rapidity of changeover from a completed blade to a blade to be hard faced also enhances the flexibility of the welding machine.

These and other features, aspects and advantages of the present invention will become more apparent from the following description, appended claims and drawings.

DESCRIPTION OF THE PREFERRED EMBODIMENTS

Figure 1:
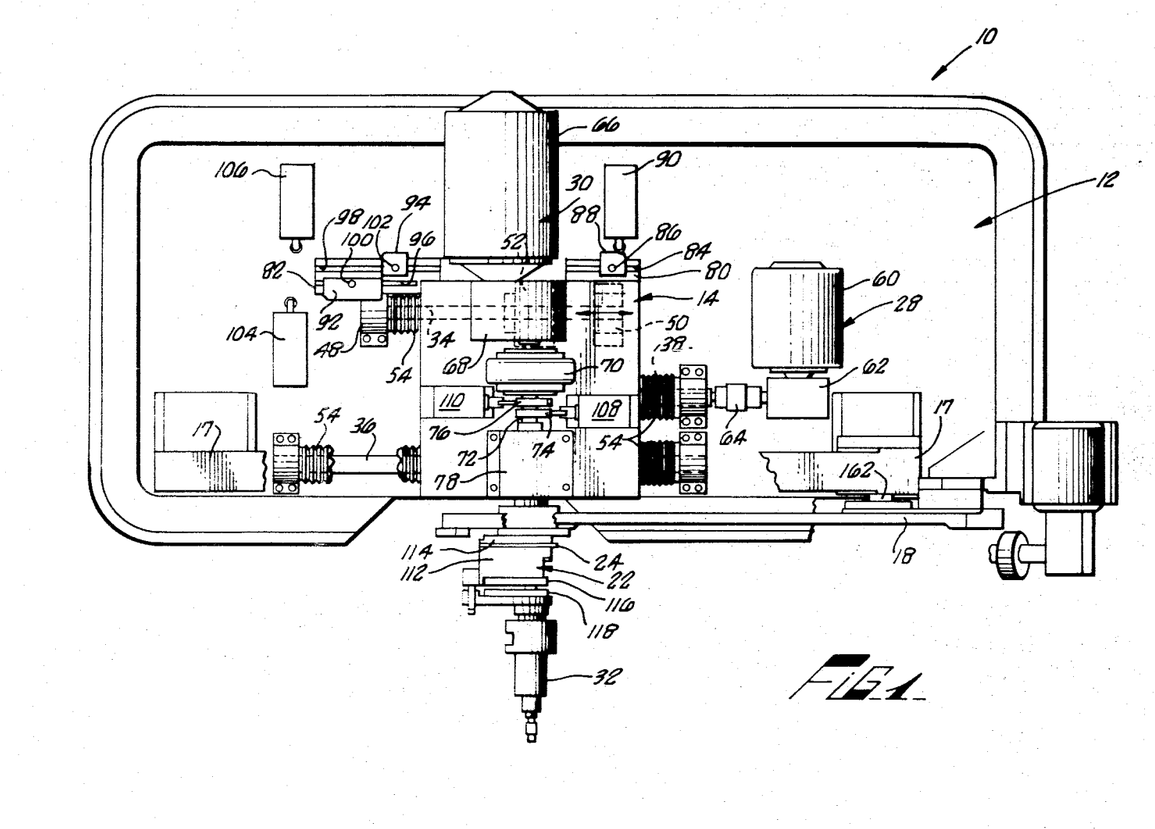
FIG. 1 is a plan view, partly fragmented, of a preferred embodiment of the welding machine of the present invention.
Figure 2:
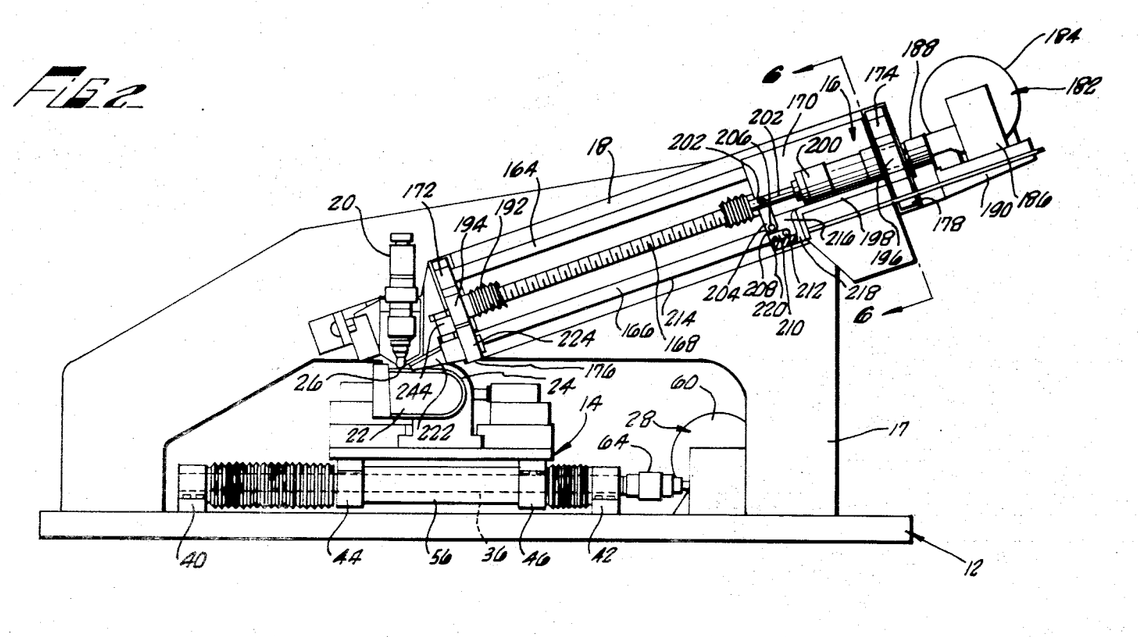
FIG. 2 is a front elevational view of the embodiment of the invention shown in FIG. 1.

In FIGS. 1 and 2, the improved welding machine is indicated in general by reference numeral 10. The machine includes a base 12 on which is mounted a table 14. A cold wire feed assembly 16 is pivotally mounted to an upstanding frame portion 17 of the base through a carriage 18. The cold wire feed assembly is operative to positively advance weld rod, often referred to as "cold wire," into the welding zone. A welding torch 20 is mounted on the carriage. A blade jig assembly 22 is provided for securing the blade in a position to be hard faced. A master cam 24 of this assembly is in position for a cam follower 26 on carriage 18 to track.

Table 14 is capable of translating or traversing on base 12. This motion is effected through drive 28. Jig assembly 22 is capable of rotation with respect to welding torch 20. Rotation drive 30 effects this rotation. The jig assembly and drive 30 are mounted on table 14 and thus are responsive to the table's translation.

A blade to be hard faced is secured in jig assembly 22 by a spring clamp 32.

In general, after a blade is secured by clamp 32 in jig assembly 22, table 14 traverses a prescribed distance in response to drive 28 for the hard facing of a portion of the blade. At a predetermined point, jig assembly 22 is rotated by rotation drive 30 through a prescribed arc to effect hard facing on a rounded end of the blade. After the hard facing has been applied to this rounded end, table 14 is traversed a second time in the same direction as before for the hard facing of the remaining portion of the end of the blade. During this hard facing application, cold wire feed assembly 16 continuously feeds a cold wire of hard facing material into a welding zone. The cold wire feed assembly and torch 20 are positioned relative to the workpiece by the tracking of cam follower 26 on master cam 24.

In greater detail, table 14 is supported by a pair of shafts 34 and 36 and is driven by a drive screw 38. The drive screw is shown to best effect in FIG. 3. Shaft 36 is secured to base 12 through mounting bosses 40 and 42 and is received in a pair of linear, recirculating ball bearings mounted in bearing caps 44 and 46. These caps are secured to the bottom of table 14. Consequently, table 14 is capable of linear travel on shafts 34 and 36. The mounting bosses for shaft 34, indicated by reference numerals 48 and 50, are mounted to base 12. A bearing cap 52 holds a recirculating linear ball bearing which receives shaft 34. Cap 52 is also secured to the bottom of the table. Dust covers or boots 54, in the form of bellows to allow for contraction and expansion, are provided for the shafts and drive screw 38 to preserve the bearing surface of the shafts and the threads of the drive screw. A complementary, tubular dust shield 56 is provided interiorly of journal caps 44 and 46 to protect shaft 36. The recirculating linear ball bearings are provided for shafts 34 and 36 for frictionless travel of the table.

Figure 3:
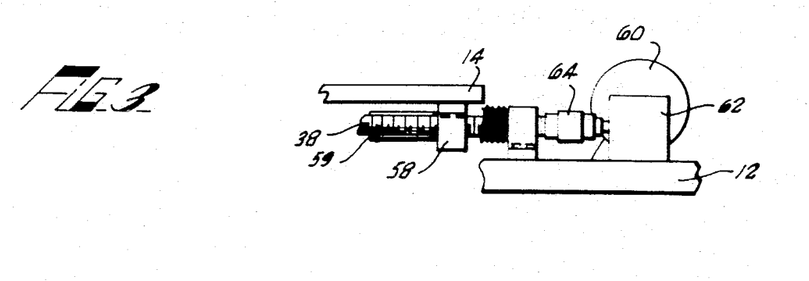
FIG. 3 is a fragmentary view of the translation drive of the table illustrated in the first two Figures.

The table drive includes ball screw 38 which is received in and drives a nut disposed in a mounting cap 58. The nut is preferably of the recirculating ball type. Mounting cap 58 is attached to table 14, as is shown in FIG. 3. The screw is driven by a shunt wound DC motor 60 through a right-angle reducer 62 and coupling 64 between the screw and the reducer. A protective sleeve or boot 59 is disposed around screw 38 and secured to cap 58 to preserve the screw's threads. As the motor is driven, screw 38 rotates to drive table 14 through the nut in mounting cap 58 to the left in FIG. 2. The table, being supported by shafts 34 and 36, is constrained to travel parallel to the base and at right angles to the axis of rotation of rotation drive 30.

Blade rotation is produced by drive 30. The drive generally consists of a shunt wound DC motor 66 and a reducer 68. The reducer is coupled to jig assembly 22 through a coupler 70. A shaft 72, which is driven through the coupler, mounts a pair of cams 74 and 76. This shaft carries the jig assembly. A bearing assembly 78 is attached to table 14 and receives shaft 72.

As will be described in considerable detail subsequently, traverse and rotation controls are effected at the proper time to ensure the accurate application of hard facing to a chain saw blade. After the completion of a hard face application, table 14 and jig assembly 22 are returned to their starting positions. This sequencing of traverse and rotation of the welding machine is generally accomplished, however, by limit switches and actuators positioned to sense at the proper time the relative translational and rotational positions of jig assembly 22 and table 14.

For this purpose, a T-slot track 80 and a T-slot track 82 are mounted at the translational ends of table 14. Track 80 has a T-slot 84 which receives a screw and T-slot nut 86 of an actuator cam 88. Cam 88 is therefore adjustable. Cam 88 is in position to actuate a limit switch 90 at the end of the travel return portion of the weld cycle to terminate table travel. Track 82 receives two adjustable actuator cams 92 and 94 in T-slots 96 and 98 through screws and T-slot nuts 100 and 102. Cam 92 is disposed in T-slot 96 to engage a limit switch 104 to terminate the initial traverse of table 14 and initiate the rotational portion of the cycle. Cam 94 is disposed to engage a limit switch 106 to indicate the end of the second traverse of table 14, the second traverse being in the same direction as the first.

Rotational sensing is effected through cams 74 and 76. These cams, secured to shaft 72, are disposed to engage, at proper times, limit switches 108 and 110. Cam 74, when it actuates limit switch 108, stops rotation of shaft 72 and initiates the second stage of traverse of table 14. Cam 76, when it actuates limit switch 110, terminates rotation when jig assembly 22 is being returned to its starting position.

Figures 4, 5, 6, 7, 8:
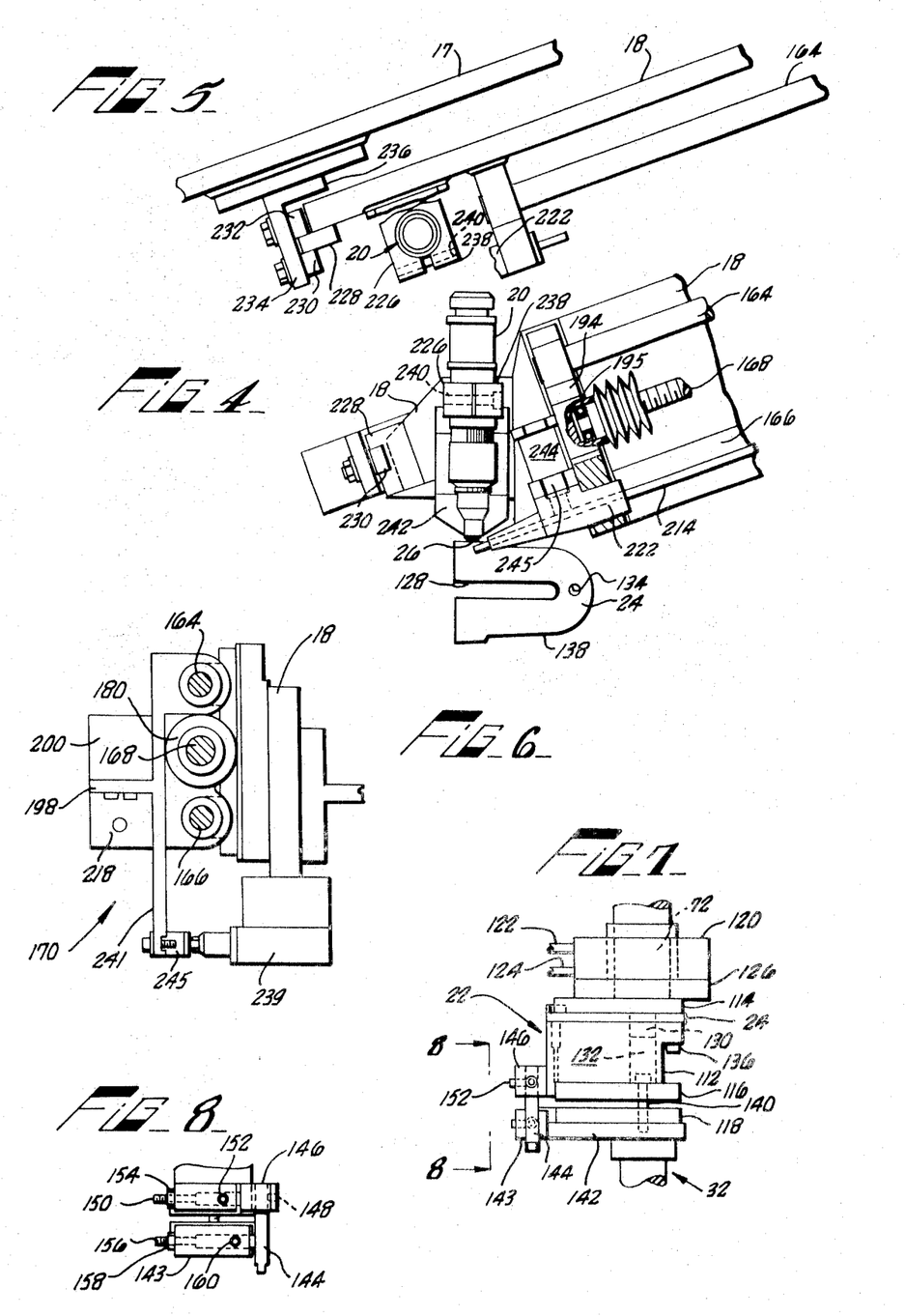
FIG. 4 is a detailed view, partly fragmented, of the weld rod or wire feed assembly, torch and cam of the present invention.
FIG. 5 is a top plan view of FIG. 4 illustrating the cam follower guides of the present invention.
FIG. 6 is a view taken along line 6—6 of FIG. 2 illustrating the weld wire feed assembly and carriage of the present invention.
FIG. 7 is a detailed view of the workpiece mounting jig of the present invention.
FIG. 8 is a view of the workpiece mounting jig illustrated in FIG. 7 taken along line 8—8.

As seen in FIGS. 1 and 7, jig assembly 22 generally comprises a mounting member 112 which is detachedly coupled to a block member 114. Block member 114 is, in turn, secured to shaft 72 for rotation with it. Master cam 24 is removably secured between these two members. Mounting member 112 carries a copper backing plate 116 which is disposed to provide a bearing surface for a blade being hard faced. A complementary plate 118, also copper, is carried by clamp 32. Because of the considerably heat evolved during hard facing, there is a requirement that the bearings of bearing assembly 78 be cooled. A refrigerating coil 120 is therefore disposed about shaft 72 between jig assembly 22 and the bearing assembly. Inlet and outlet lines 122 and 124 are shown emanating from this coil. The coil is received by a flanged bushing 126 which in turn receives shaft 72.

Master cam 24, shown in FIG. 4, has a mounting slot 128 which is received over a locater pin 130 (see FIG. 7). Locater pin 130, in turn, is received in a bore 132 of mounting member 112. Cam 24 also has a hole 134 for receiving a bolt 136 to properly position the cam in the jig assembly. A cam surface 138 of cam 24 corresponds to the weld profile of a blade to be hard faced.

Clamp 32 is removably secured to jig assembly 22 through a pin 140. The clamp has a backing member 142 which has a upstanding portion or boss 143 directly beneath an alignment pin 144 (FIGS. 7 and 8). The alignment pin is received in a block 146 of jig assembly 22 and is secured therein by a set screw 148. The position of pin 144 is adjustable in the vertical through an adjusting screw 150 which carries block 146. Adjusting screw 150 is secured by a setscrew 152 and a nut 154. A rotational stop position of clamp 32 is determined by pin 144 and an adjustable threaded pin 156 secured in upstanding portion 143. This pin is secured by a nut 158 and a setscrew 160 in the desired vertical position. When clamp 32 is secured to jig assembly 22 through pin 140, an operator merely ensures that pin 156 is brought into engagement with pin 144. When the clamp is so placed, a point on a blade to be hard faced will contact pin 144 to properly orient the blade for hard facing. The adjustability of clamp 32 relative to jig assembly 22 provides for various blade profiles and keeps plates 116 and 118 in proper alignment. The point on the blade, of course, is not on the weld periphery of the blade.

Cold wire feed assembly 16 is mounted on a carriage 18 which is in the form of a generally flat plate. The carriage is pivotally mounted to frame 17 through a shift 162 (see FIG. 1). The shaft is received in a bushing secured in the frame. As is shown in FIG. 2, a pair of shafts 164, 166 and a screw 168 provide for restrained travel of a slide 170 of the cold wire feed assembly. Slide 170 is carried by shafts 164 and 166 through three ball bushings, one for shaft 166 and two for shaft 164. Shafts 164 and 166 are secured in bosses 172 and 174, and 176 and 178, respectively. Slide 170 mounts a recirculating ball nut 180 which is engaged by screw 168 (FIG. 6). A drive 182, in the form of a shunt wound DC motor and right-angle reducer 184 and 186, respectively, is drive-coupled to the screw through a coupling 188. The drive is mounted on a platform 190 of the carriage. A bellows boot or dust cover 192 is provided for screw 168 in order to keep it free of dirt. The screw is journaled in a boss 194 of carriage 18 in a bearing 195 (FIG. 4). At the upper end of the screw, a journal is also provided by a boss 196 of carriage 18 and a bearing disposed in the boss (not shown).

The slide has a platform 198 which extends laterally away from the body of the slide for the mounting of an air cylinder 200. This cylinder has a displaceable element in the form of a shaft 202 which pivotally engages a cam 204. Cam 204 in turn is pivotally mounted to the slide through a pin 206. This cam has a camming surface 208 engageable with a lug 210. Lug 210 is pivotally secured to the slide by pivot pin 212. A wire of hard facing material 214 is disposable in a passage 216 extending through an extended portion 218 of the slide. A bearing surface 220 of the extended portion cooperates with lug 210 to provide a clamp for the hard facing wire. As will be explicit as this description proceeds, wire 214 is clamped as slide 170 travels on screw 168 toward torch 20 to advance the wire into the welding zone.

The lower end of the wire is guided by a fitting 222 having a bore sized for the passage of the wire. This fitting is secured in a laterally extending boss 224 of carriage 18.

As is clearly seen in FIGS. 4 and 5, a torch mount 226 is secured to carriage 18 at the lower end of the cold wire feed assembly. This lower end also mounts a guide 228 which is disposed between a pair of rollers 230 and 232 to maintain the lateral position of the torch and the egress of the hard facing wire in proper relationship to the blade being hard faced. Rollers 230 and 232 are mounted on an ear 234 of a bracket 236 which in turn is mounted to frame 17.

The torch mount is in the form of a torch bracket having a collar 238 which may be locked on torch 20 by setscrew 240.

Cam follower 26, which tracks on cam surface 138 of cam 24, is a roller rotatably fixed to cam follower bracket 242. The cam follower bracket and its cam follower are disposed inwardly of torch 20 towards carriage 18. The cam follower bracket is secured to carriage 18.

The torch is of any of the well-known variety of torches capable of inert gas arc welding.

A limit switch 239 is secured to carriage 18. An ear 241 of slide 170 extends downwardly therefrom and mounts an actuator 245. Actuator 245 is disposed to actuate limit switch 239. Limit switch 239 controls feed motor 184 to stop slide 170 at the completion of its return cycle.

A lower clamping air cylinder 244 is provided as illustrated in FIG. 4. This cylinder has an element which is actuatable to clamp wire 214 at a point very close to the welding zone. The lower clamping cylinder is secured by a nut 245 in fitting 222 in position for the cylinder's actuatable element to engage wire 214 within the fitting.

The lower clamping air cylinder serves to keep weld wire close to the welding zone upon return of slide 170 to its initial position for the advancement of the wire into the zone.

Figures 9, 10:
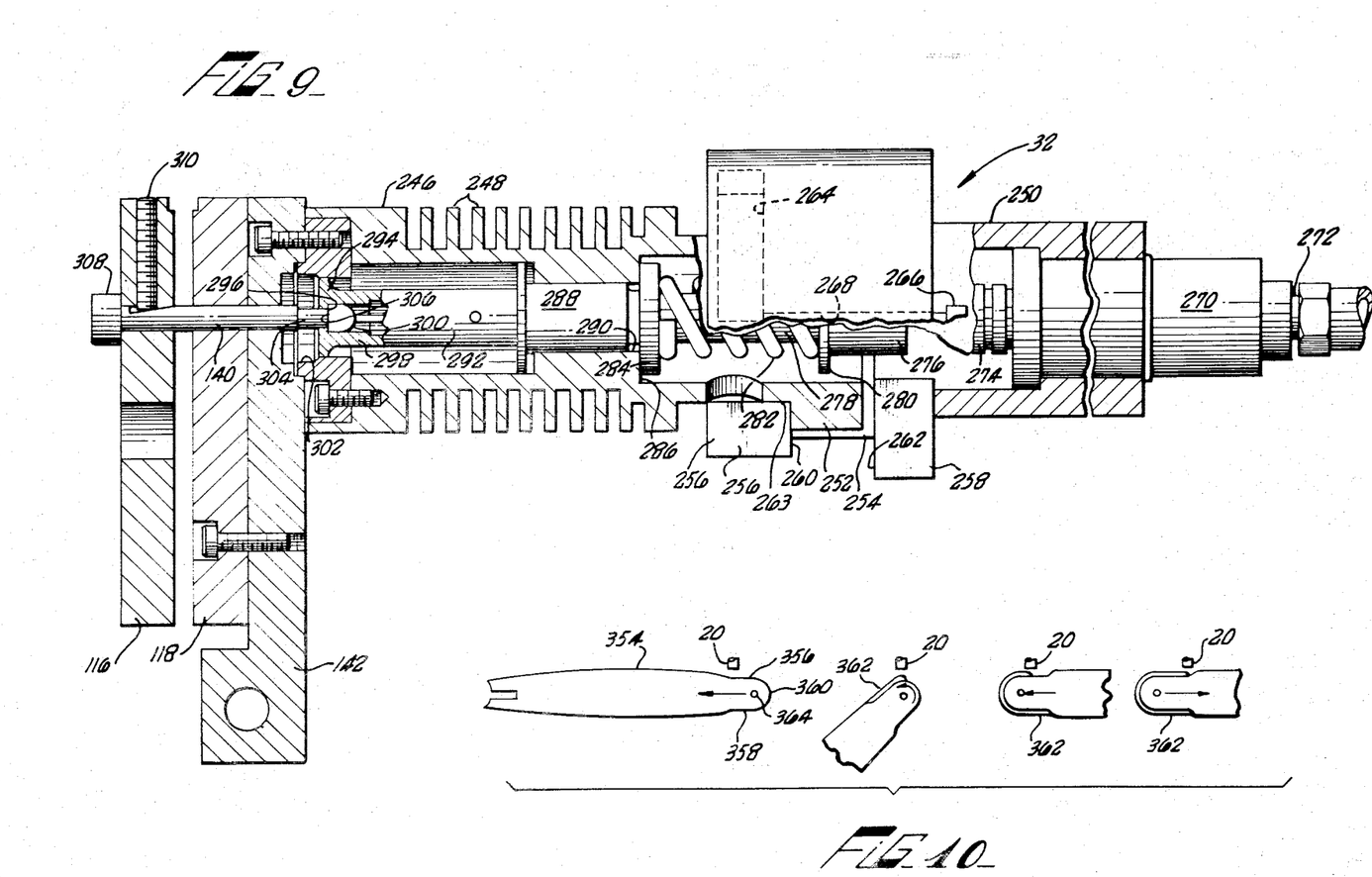
FIG. 9 is a detailed view, partly in half section, of the workpiece holding clamp of the present invention.
FIG. 10 is a schematic view of the linear and rotational travel effected by the welding machine of the present invention on a workpiece being welded.

With reference to FIG. 9, clamp 32 will now be described in detail. The clamp includes a cylindrical barrel 246 having a plurality of circular and spaced apart cooling fins 248. A hydraulic cylinder housing 250 is removably securable on barrel 246. Attachment is effected by an interlocking flange 252 of the barrel which is disposed in a flange receiving recess 254 of housing 250. Recess 254 is between flangelike portions 256 and 258 of housing 250. These flangelike portions present spaced apart radial shoulders 260 and 262. Shoulder 260 acts as a bearing surface for flange 252. The shoulders are spaced apart axially to allow removal of mounting member 250. Flange 252 is recessed at 263 to provide a bearing surface complementing shoulder 260 which maintains housing 250 in place. Flangelike portions 256 and 258 define a generally U-shaped cutout for receiving barrel 246 and for removal of housing 250 by simply pushing the housing forward such that flange 256 clears recess 263 and lifting the housing upwardly and off the barrel.

The housing also provides for the cooling of the clamp. This is effected by a semicircular passage 264 and by water cooling hose 266, only partially shown. Cooling hose 266 communicates with passage 264 through passage 268, again only partially shown. A complementary cooling hose and passage are disposed diametrically opposite the ones illustrated to provide coolant circulation.

The housing receives a hydraulic cylinder 270. This cylinder has a nipple 272 for receiving a hydraulic hose. Hydraulic pressure is supplied by an air-hydraulic booster which converts low-air pressure to high-hydraulic pressure. Hydraulic cylinder 270 is responsible for the removal of clamp 32 from pin 140.

A shaft 274, which is translationally responsive to the actuation of the cylinder, is disposed to engage a head 276. Head 276 is secured on a shaft 278 and has a bearing flange 280 for a compression spring 282. Spring 282 is also engaged by annular washer 284 disposed to bear against a radial shoulder 286 within barrel 246. A coupling member 288, translationally disposed in a bore 290 of the barrel, is part of shaft 278. A collet 292 is attached to this coupling member.

This collet is adapted to receive pin 140. For this purpose, the collet has an expandable head 294 which has inwardly extending flanges 296 of the head's segments 298. These segments are expandable radially outward to free head 300 of pin 140. This is accomplished by the actuation of cylinder 270 which drives the collet to the left in FIG. 9 into an annular enlarged bore 302, allowing the segments of the collet to expand radially outward. When so expanded, the collet frees the pin, and clamp 32 can be removed from the pin by merely pulling it to the right in FIG. 9.

Pin 140 has a cylindrical portion 304 of reduced diameter for receiving the segments of collet 292 and to define a radial shoulder 306 of head 300. Shoulder 306 is provided to transmit the force of spring 282 to pin 140. Head 300 is rounded to permit easy insertion of the head into the collet.

Backing member 142, which was previously described, is disposed to be engaged by pin 144 of the jig assembly. The flange member also mounts copper plate 118. This copper plate has a hole for the passage of pin 140. Complementary copper plate 116 receives pin 140 and provides the bearing surface for a pinhead 308 of pin 140 which complements shoulder 306 of head 300. The pin is secured in place in this latter copper plate by a setscrew 310. When cylinder 270 is not actuated, spring 282 urges shaft 278 and collet 292 into the position shown in FIG. 9 such that segments 298 of collect 292 are clamped tightly about head 300 of pin 140. In this position, it is readily seen that a strong spring force is present against a blade disposed between the copper plates. The spring force maintains the blade in proper position for its hard facing.

Figure 11:
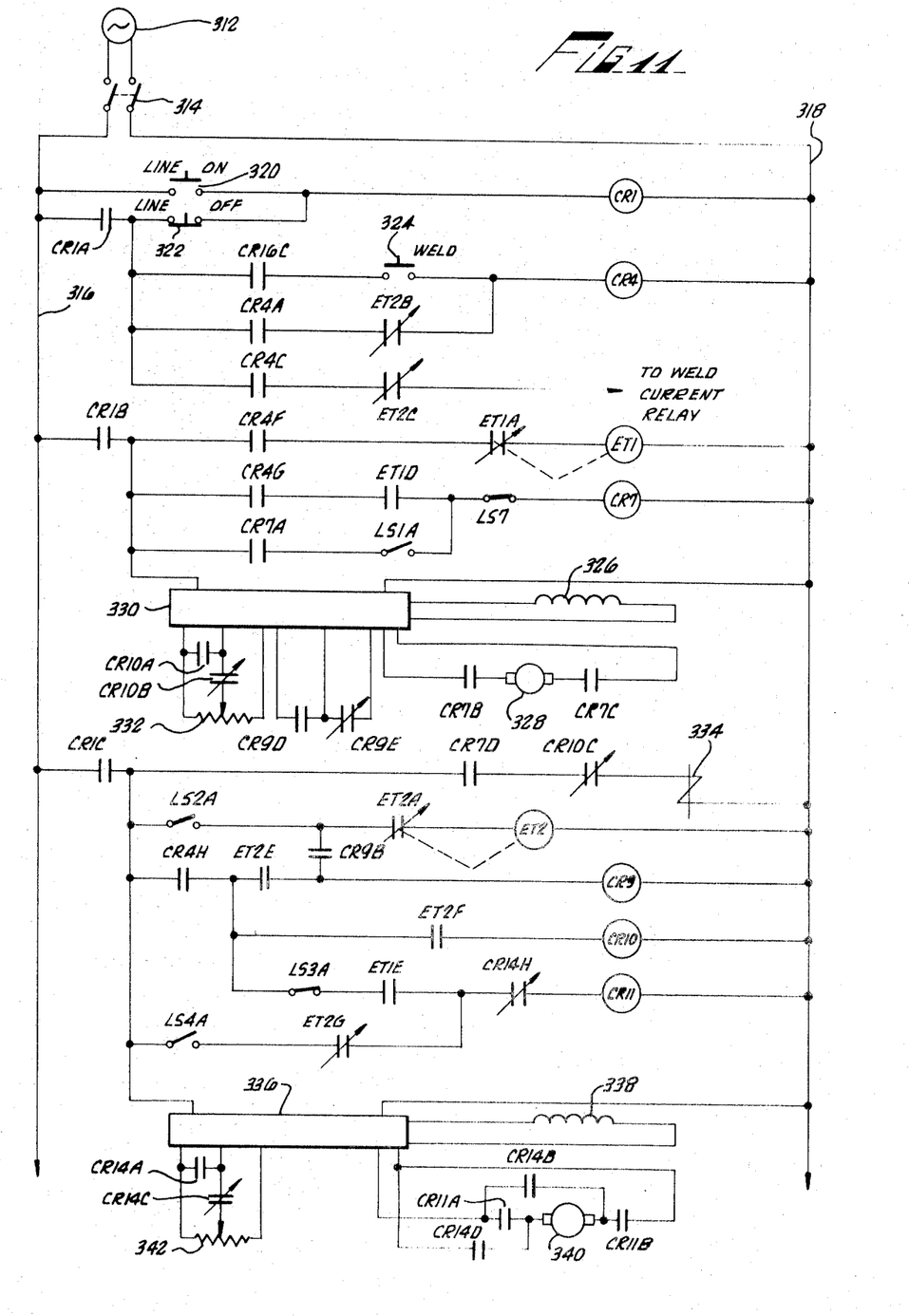
FIG. 11 and 11A are a circuit schematic illustrating the controls of the present invention.
Figure 11A:
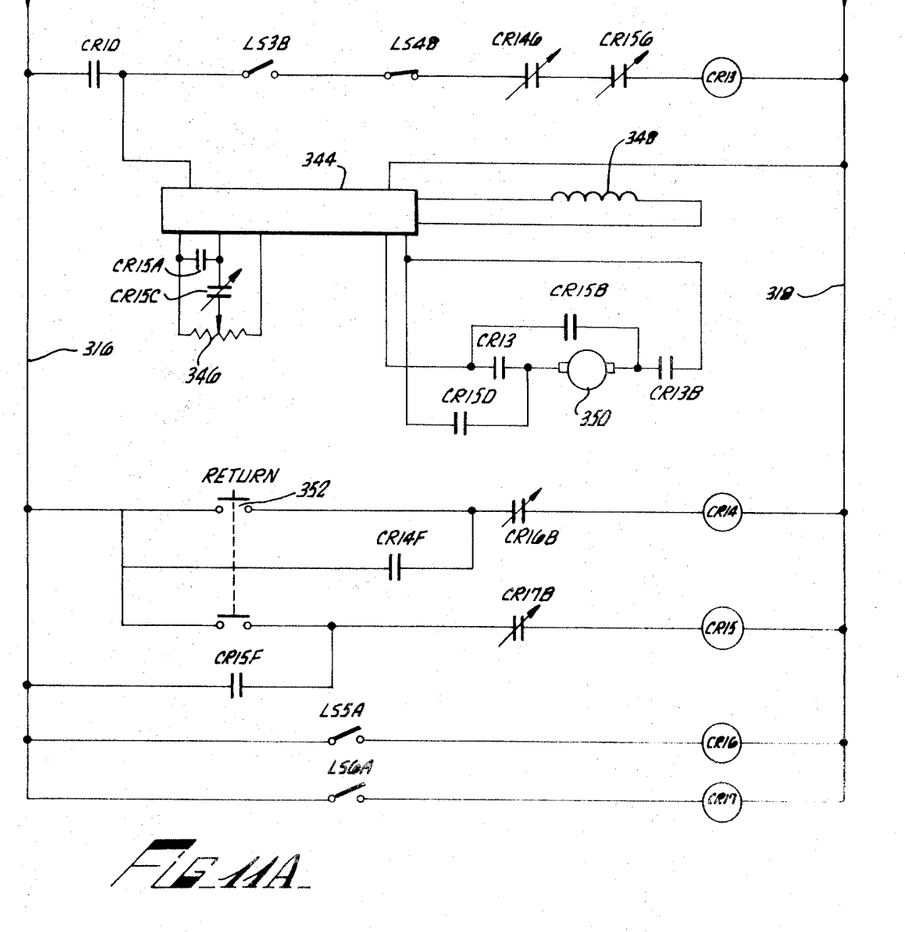
Figure 12:
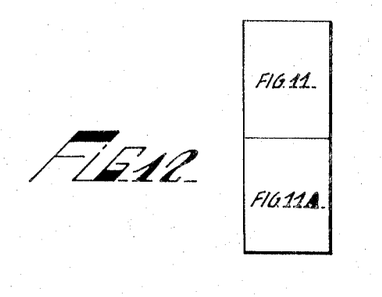
FIG. 12 is a composite of FIGS. 11 and 11A.

With reference to FIGS. 11 and 11A, the control circuitry will be described. The circuitry shown is for a semiautomatic hard facing cycle wherein a blade is hard faced and jig 22 is returned to its initial starting position for the hard facing of another blade. Because the attendant welding circuit is well known and forms no part of the present invention, it will not be described.

A source of alternating current 312 is connected through a main disconnect switch 314 to the balance of the circuit illustrated. The "hot side" of the circuit is indicated by a leas 316. The ground side of the circuit is indicated by a lead 318.

A line-on switch 320 is connected to the hot side of the circuit and is disposed in series between the hot side and the coil of a relay CR1. The coil of relay CR1 is wired to ground. Holding contacts CR1A of relay CR1 are wired from the hot side through a line-off switch 322 to the junction between relay CR1 and line-on switch 320. Contacts CR1A and line-off switch 322 are in series.

A series combination of normally open contacts CR16C of a relay CR16, a weld switch 324 and the coil of a relay CR4 are connected at the junction between normally open contacts CR1A and line-off switch 322 and to ground. The series combination of normally open contacts CR4A of relay CR4 and normally closed contacts ET2B of a timer ET2 is in parallel with the series combination of normally open contacts CR16C and weld switch 324.

Contacts CR4A serve to maintain the circuit to the coil of relay CR4 when timer ET2 is not energized and the circuit through weld switch 324 is open. Normally open contacts CR4C of relay CR4 are in series with normally closed contacts ET2C of timer ET2, with this combination being wired to the junction between normally open contacts CR1A and line-off switch 322. Contacts CR4C and ET2C control the welding circuit relay (not shown). This provides positive current to the blade being hard faced. The welding circuit briefly includes a high frequency oscillator to initiate an arc and a circuit to switch from low to high and from high to low amps at appropriate portions of the cycle. Again, the welding circuit is well known and commercially available.

A timer ET1 is provided. This timer has normally closed control contacts ET1A to stop it at the end of its cycle. Timer ET1 resets to a start position when deenergized. Upon resetting, contacts ET1A close. This type of timer is commercially available. Timer ET1 is also controlled by the series combination of normally open contacts CR1B of relay CR1 and normally open contacts CR4F of relay CR4. This series combination is wired to lead 316. Timer ET1 is wired to ground lead 318. The phantom coupling line between the contacts ET1A and timer ET1 is to indicate that the opening of the contacts merely stops the timer motor and does not reset the timer. Resetting occurs only when the series branch that the timer is in is deenergized.

The series combination of normally open contacts CR4G of relay CR4 normally open contacts ET1D of timer ET1. A limit switch element LS7 and the coil of a relay CR7 are wired at the junction between contacts CR1B and CR4F and to ground. A holding circuit is provided for relay CR7 comprising the series combination of normally open contacts CR7A of relay CR7 and limit switch element LS1A. This series combination is wired in parallel with the series combination of normally open contacts CR4G and contacts ET1D.

Limit switch element LS1A is of limit switch 239 and stops motor 184 upon the return of slide 170 to its starting position shown in FIG. 2. Limit switch element LS7 is disposed to sense the advance of wire 214 and to stop slide 170 in the event of over travel when, for example, its direction of travel is not reversed at the appropriate time.

Contacts CR1B of relay CR1 also control the circuit to a rectifier, a speed control and a direction circuit for cold wire feed motor 184. The field windings of the cold wire feed motor are indicated by reference numeral 326, while the armature of the motor is indicated by reference numeral 328. The rectifier is indicated by reference numeral 330. The rectifier is in circuit with hot lead 316 through normally open contacts CR1B and is connected directly to ground. The speed control circuit consists of a potentiometer 332, and normally open contacts CR10A and normally closed contacts CR10B of a relay CR10. This circuit provides two speeds for the motor. The first speed is for welding and is relatively slow. The second and faster speed is used to return the slide of the cold wire feed assembly to its initial starting position. Speed control is also effected by the adjustable contact of the potentiometer. For hard facing, current flows through contacts CR10B into the resistor of potentiometer 332, and then to the field and armature windings of the cold wire feed motor. The potentiometer can be short circuited when contacts CR10A are closed and contacts CR10B are open to impose full rectifier current on the armature and field windings of the cold wire feed motor. This occurs when slide 170 is to be returned to its starting position.

As was previously mentioned, the cold wire feed motor may be reversed. This is accomplished through the circuit of normally open contacts CR9D and normally closed contacts CR9E, both of relay CR9. When contacts CR9E are closed, and contacts CR9D open, the polarity of the motor is such that it will go forward. When contacts CR9E are open and contacts CR9D closed, the polarity is reversed, as is the rotation of the motor. The armature of the motor is controlled by its in-circuit connection through normally open contacts CR7B and CR7C of relay CR7. When these contacts are closed the motor is energized.

Relay CR1 also controls the energization of travel motor 60, and the coil of the solenoid which controls clamping cylinder 244 and cold wire feed cylinder 200. Normally open contacts CR1C of relay CR1 couple hot lead 316 to the series combination of normally open contacts CR7D of relay CR7, normally closed contacts CR10C of relay CR10 and a coil 334 of the solenoid which controls the clamping cylinder and cold wire feed cylinder. As indicated, both the clamping and cold wire feed air cylinders are controlled by a single solenoid whose coil is indicated by reference numeral 334. The cylinders have their air supply lines oriented such that when one cylinder clamps, the other unclamps. The simultaneous clamping and unclamping of the cylinders are determined by the single solenoid which controls a two-position valve that determines the pressurization of each cylinder's power chamber.

As with timer ET1, timer ET2 is self-resetting when deenergized. The timer's contacts ET2A stop timer ET2 at the end of its cycle but do not deenergize the timer, the opening of one of the other control elements in series with the timer being necessary before it is deenergized. Contacts ET2A are internal of the timer and are responsive to the timer's motor. The phantom coupling line again is to indicate that a circuit may be present to the timer even though contacts ET2A are open. The timer is also controlled by the series combination of limit switch element LS2A and normally open contacts CR1C of relay CR1. Limit switch element LS2A is wired to the junction between normally open contacts CR1C and normally open contacts CR7D. Limit switch element LS2A is of limit switch 106 and closes near the end of the second travel traverse of the hard facing cycle.

The series combination of normally open contacts CR4H of relay CR4, normally open contacts ET2E of timer ET2, and the coil of relay CR9 are wired to the junction between normally open contacts CR1C and CR7D. Normally open contacts CR9B are wired at the junction of limit switch element LS2A and timer ET2 and the junction of contacts ET2E and the coil of relay CR9. Contacts ET2F of timer ET2 are in series with the coil of relay CR10. This series combination is connected at the junction between contacts CR4H and ET2E. A series combination of limit switch element LS3A, normally open contacts ET1E of timer ET1, normally closed contacts CR14H of relay CR14, and the coil of relay CR11 are also connected at the junction between normally open contacts CR4H and contacts ET2E. A series combination of limit switch element LS4A and normally closed contacts ET2G of timer ET2 is in parallel with the series combination of contacts CR4H, limit switch element LS3A, and normally open contacts ET1E. Limit switch element LS3A is of limit switch 104 and opens at the end of the first hard facing traverse to stop motor 60. Limit switch element LS4A is of limit switch 108 and closes at the end of forward rotation to start the second hard facing traverse and stop rotation.

Travel motor 60 is capable of forward and reverse motion at low and high speeds, respectively. The speed of this motor may also be adjusted. A rectifier 336 provides for rectification of the AC current from hot lead 316. This circuit is established through normally open contacts CR1C. The field windings of the travel motor are indicated by reference numeral 338, while the armature is indicated by reference numeral 338, while the armature is indicated by reference numeral 340. As with the cold wire feed motor, potentiometer 342 is provided to adjust speed. Normally open contacts CR14A and normally closed contacts CR14C, both of relay CR14, are provided to switch from low to high speed. Again this is accomplished when the relay is energized by the short circuiting of the potentiometer. This is done when relay contacts CR14A are closed and contacts CR14C are open.

Normally open contacts CR11A and CR11B of relay CR11 are in circuit with armature 340 and, when closed, provide current from rectifier 336 to energize the armature of travel motor 60 for rotation in the forward direction. To reverse current flow through the armature, the polarity of the current is reversed. This is effected by contacts CR14B and CR14D of relay CR14. When relay CR11 is energized, relay CR14 is out of circuit and a circuit is established to armature 340 through closed contacts CR11A and CR11B. When relay CR14 is energized, relay CR11 is out of circuit and contacts CR14B and CR14D are closed to reverse the polarity to armature 340 and reverse the direction of rotation of the travel motor and start the second traverse.

Relay CR1 also controls the rotation of jig assembly 22 through normally open contacts CR1D. Again, the rotation circuit is capable of driving motor 66 in both a forward and a reverse direction at low and high speeds, respectively. Again, a rectifier must be provided. This rectifier is indicated by reference numeral 344. Speed control is effected through potentiometer 346. Potentiometer 346 may be short circuited when relay CR15 is energized by the closing of contacts CR15A and the opening of contacts CR15C of this relay. The rotation motor field windings are indicated by reference numeral 348, while its armature is indicated by reference numeral 350. The direction at which the motor rotates is again determined by the polarity of the current to its armature. A circuit to the armature is established from the rectifier through normally open contacts CR13A and CR13B of relay CR13 when this relay is energized to close these contacts. Polarity is reversed when contacts CR13A and CR13B are open and contacts CR15B and CR15D of relay CR15 are closed. Current may be viewed as entering the armature from the left for forward rotation and as entering the armature from the right for reverse rotation.

The energization of the coil of relay CR13 is controlled by the series combination of limit switch element LS3B, limit switch element LS4B, normally closed contacts CR14G of relay CR14, and normally closed contacts CR15G of relay CR15. This series combination is in series with the coil of relay CR13 and with normally open contacts CR1D of relay CR1.

Limit switch element LS3B is of limit switch 104 and is disposed to close at the end of the first hard facing traverse. Limit switch element LS4B is of limit switch 108 and is disposed to open at the end of the rotation portion of the hard facing cycle to stop rotation motor 66.

A return switch 352 controls the circuit to the coils of relays CR14 and CR15. Relay CR14 is in series circuit with the upper poles of return switch 352 through normally closed contacts CR16B of relay CR16. Holding contacts CR14F of relay CR14 are in parallel with the return switch and are connected between hot lead 316 and the junction between the return switch and normally closed contacts CR16B. The circuit to the coil of relay CR15 is through normally closed contacts CR17B of relay CR17 and the lower poles of return switch 352. This series combination is connected to lead 316. Holding contacts CR15F of relay CR15 are connected at the junction of the lower poles of return switch 352 and normally closed contacts CR17B.

Limit switch element LS5A controls the current to the coil of relay CR16. Limit switch element LS6A controls the current to the coil of relay CR17. Limit switch element LS5A is of limit switch 90 and closes at the end of the travel return of table 14 to terminate travel by dropping motor 60 out of circuit. Limit switch element LS6A is of limit switch 110 and is positioned to close at the end of the rotation return cycle to terminate current flow to rotation motor 66.

The operation of the present invention will now be described.

Generally, and as shown schematically in FIG. 10, a blade to be hard faced, indicated by reference numeral 354, is placed in a position such that the body of the blade extends to the left in FIG. 2. The blade has two generally straight but slightly converging edges, indicated by reference numerals 356 and 358, and a tip 360 defined by an arc of a circle. All of the edges are to be hard faced. Welding machine 10 advances the blade to the left, as indicated by the arrow in FIG. 10, to apply hard facing. When the first linear traverse has been made, edge 356 has been hard faced, as indicated by the hard facing material shown by reference numeral 362. At this point, the blade is rotated through an arc of a circle for the application of hard facing to tip 360. This is shown by the second depiction of FIG. 10. At the completion of the hard faced application to tip 360, the blade once again traverses to the left as shown in the third depiction of FIG. 10. Finally, the blade is advanced to complete the application of hard facing as shown toward the terminal stages thereof in the last of the FIG. 10 depictions. The blade is then removed and the jig and table reversed rapidly for the hard facing of a new blade.

During the application of hard facing, slide 170 advances towards the lower end of carriage 18. Air cylinder 200 is energized during this advance and thus wire 214 is being continuously fed into the welding zone. At the end of the hard facing of blade 354, slide 170 reverses. Cylinder 200 remains momentarily energized to back wire 214 away from the welding zone. When cylinder 200 drops out of circuit air cylinder 244 is energized to keep wire 214 in position to be advanced into the welding zone and to keep wire from being retracted by friction in the feeding mechanism.

Blade removal is effected by the actuation of pneumatically actuated hydraulic cylinder 270. The actuation of this cylinder engages head 276 of shaft 278 to compress spring 282 and force collet 292 into bore 302. Segments 298 of collet head 294 are then freed to expand within the enlarged diameter bore to free head 300 of pin 400. Clamp 32 may then be removed along with the hard faced blade.

A blade 354 is secured between copper plates 116 and 118 by passing a hole 364 of the blade over pin 140. A portion of the blade is made to abut pin 144 to properly register or index surfaces 356, 360 and 358 with respect to torch 20. Clamp 32 may then be inserted on pin 140 upon the energization of hydraulic cylinder 270. With the cylinder energized, collet head 294 passes into bore 302 to expand segments 298 and receive head 300 of the pin. Upon release of the hydraulic pressure in cylinder 270, head 294 draws inwardly such that segments 298 clamp tightly against shoulder 306 of head 300. A holding force on blade 354 which is a direct function of the compression of spring 282 results.

During the application of hard facing, coolant water is circulated through semicircular passage 264, as well as through cooling coil 120. The proper position for torch 20, and the egress point and angle of wire 214, are determined by the tracking of cam follower 26 on master cam 24. This tracking produces a substantially constant arc-to-workpiece distance and a substantially constant wire-to-welding zone relationship.

A more detailed description of the welding cycle with specific reference to the control circuit will now be described. Disconnect switch 314 is closed to establish a circuit to hot lead 316 and to ground 318. Line-on switch 320 is then closed to energize the coil of relay CR1. With the coil of relay CR1 energized, relay contacts CR1A, CR1B, CR1C and CR1D are closed. Thus all the circuits controlled by these contacts may be energized. As such, fields 326, 328 and 348 of cold wire feed motor 184, travel motor 60 and rotation motor 66 are then energized.

Welding wire 214 is then adjusted to the proper starting point. A blade 354 is then inserted into position to be welded and clamped therein by clamp 32, as previously described.

At this point, relay CR4 is deenergized. Its contacts CR4A, CR4C, CR4F, CR4G and CR4H are therefore opened. Similarly, relay CR7 is deenergized and its contacts CR7A, CR7B, CR7C and CR7D open. Timer ET1 is also deenergized. Contacts ET1A are closed while ET1D and ET1E are open. Relay CR7 is deenergized and its contacts CR7A, CR7B, CR7C and CR7D open. Timer ET2 is also deenergized with its contacts ET2A, ET2B, ET2C and ET2G closed. Contacts ET2E and ET2F of timer ET2 are open. Contacts CR9B and CR9D of relay CR9 are open because the relay is deenergized. Accordingly, contacts CR9E are closed. Relay CR10 is also deenergized and therefore contacts CR10A are open while contacts CR10B and CR10C are closed. Relay CR11 is deenergized and therefore its contacts CR11A and CR11B are open.

Relay CR13 is deenergized and its contacts CR13A and CR13B are open. Relay CR14 is deenergized and its contacts CR14A, CR14B, CR14D and CR14F are accordingly open while its contacts CR14C, CR14G and CR14H are closed. Relay CR15 is also deenergized and, as a consequence, contacts CR15A, CR15B, CR15D and CR15F are open while contacts CR15C and CR15G are closed.

However, relay CR16 is energized, and therefore its contacts CR16B and CR16C are opened and closed, respectively. Also, relay CR17 is energized and therefore its contacts CR17B are open.

Weld switch 324 is then closed momentarily to energize relay CR4 which is interlocked through now closed contacts CR4A in circuit with hot lead 316. Contacts CR4C, being closed, establish weld current to blade 354. Timer ET1 is also energized by the closing of contacts CR4F. With the energization of timer ET1, contacts ET1D close to energize the coil of relay CR7 which is interlocked through closed contacts CR7A.

A circuit is then established through contacts CR7B and CR7C to the armature of cold wire feed motor 184. Slide 170 of wire feed assembly 16 therefore begins to travel towards the welding zone. With the beginning of motion of the slide, limit switch element LS1A closes to interlock the coil of relay CR7 through its closed contacts CR7A. After contacts CR7A close, contacts ET1D open.

With the energization of relay CR7, contacts CR7D close to establish a circuit through closed contacts CR1C to solenoid coil 334 which controls air cylinder 200. This will cause shaft 202 to rotate cam 204 against lug 210 to clamp wire 214 between the lug and surface 220. Wire 214 will then advance with slide 170 of cold wire feed assembly 16. The element of air cylinder 244, being retracted, does not prevent the advance of wire 214.

Contacts ET1E close with the energization of timer ET1, and inasmuch as contacts CR14H of relay CR14 are closed, a circuit is established to the coil of relay CR11. Contacts CR11A and CR11B of this relay are then closed to establish current through armature 340 of travel motor 60. The travel motor will then traverse table 14 to the left in FIG. 2 at the slow welding speed inasmuch as contacts CR14A and CR14C are open and closed, respectively.

At the end of the first travel, that is, at approximately the position shown by the second depiction of FIG. 10, limit switch element LS3A opens to deenergize relay CR11 and to open contacts CR11A and CR11B to terminate travel by the deenergization of the armature 340 of travel motor 60.

Limit switch element LS3B closes at the end of the first travel to energize relay CR13 and to establish a circuit through now closed contacts CR13A and CR13B to armature 350 of rotation motor 66. Rotation of blade 354 then commences. Timer ET1 is set such that its contacts ET1E open after the completion of the first travel or traverse. As a consequence, timer contacts ET1E open. Contacts ET1A are set to open during the forward rotation to stop timer ET1. The timer is reset when contacts ET2B open.

At the end of the rotation of blade 354, limit switch element LS4B opens to deenergize relay CR13 and terminate the circuit to armature 350 to stop the rotation motor. But limit switch element LS4A closes to energize relay CR11. With the energization of this relay, a circuit is once again established to armature 340 and the second traverse begins.

Near the end of this second traverse, limit switch element LS2A closes. This starts timer ET2 and opens timer contacts ET2G. Inasmuch as contacts ET1E are open, the circuit to relay CR11 is open with the opening of contacts ET2G. As a consequence, current through armature 340 ceases and travel stops.

At this point, contacts ET2E close to energize relay CR9 which is interlocked through contacts CR9B. Contacts CR9E and CR9D open and close respectively to reverse the polarity of current flowing through armature 328 of cold wire feed motor 184. As a consequence, slide 170 begins to retreat away from the welding zone. Simultaneously, of course, contacts ET2C open and are set to open to terminate weld current and end the application of hard facing.

Contacts ET2F are set to close momentarily after slide 170 begins return to its starting position to energize relay CR10. With the energization of relay CR10, contacts CR10A close and CR10B open to short circuit potentiometer 332 and establish full speed current to armature 328 of cold wire feed motor 184. Contacts CR10C open to unclamp wire 214 from slide 170. Simultaneously, air cylinder 244 is actuated to clamp the weld wire. Wire 214 is clamped proximate the welding zone and will not back out of fitting 222 upon the return of slide 170.

When slide 170 returns to its starting position, limit switch element LS1A opens to deenergize relay CR7 and terminate current flow to armature 328 of motor 184 and stop the slide.

Contacts ET2B of timer ET2 are set to open after slide 170 returns. The opening of contacts ET2B deenergizes relay CR4, which deenergizes timer ET1. With the deenergization of timer ET1, it resets. Contacts ET1D and ET1E also open. With the dropping out of circuit of relay CR4, contacts CR4H open to deenergize relay CR10 and open its contacts CR10A and close contacts CR10B and CR10C. Solenoid coil 334 of the valve which controls air actuated cylinders 200 and 244 is then in circuit to clamp wire 214 for the next hard facing cycle. Cold wire feed motor 184 is switched back to its lower, hard face applying speed.

At the end of the second traverse, table 14 is to the left in FIG. 2. Jig assembly 22 has been rotated through the arc of a circle corresponding to the circular tip of blade 354.

The hard faced blade may then be unloaded and a new blade installed. At this point, limit switch element LS5A is open and relay CR16 is therefore deenergized. At this point, also, limit switch element LS6A is open and relay CR17 is deenergized.

With a new blade to be hard faced in place, return button 352 is momentarily depressed to energize relay CR14 which is interlocked in circuit through holding contacts CR14F. Contacts CR14B and CR14D are closed and contacts CR14A and CR14C closed and opened, respectively. With the closing of contacts CR14A and the opening of contacts CR14C, potentiometer 342 is short circuited and full rectifier current is available to armature 340 of travel motor 60. Contacts CR11A and CR11B are open because relay CR11 is out of circuit. With contacts CR14B and CR14D closed, the first stage of travel return begins at full speed.

Also with the momentary depression of return switch 352, relay CR15 is energized and interlocked through contacts CR15F. This closes contacts CR15A and opens contacts CR15C to short out potentiometer 346. Contacts CR15B and CR15D are also closed when relay CR15 is energized to begin rotation in reverse at full speed simultaneously with travel return.

When the travel return starts, limit switch element LS2A opens to deenergize timer ET2 and allow it to reset itself. With the deenergization of ET2, relay CR9 is deenergized to open contacts CR9D and close contacts CR9E and reverse the polarity of armature 328 of cold wire feed motor 184 to forward.

When the travel return finishes, limit switch element LS5A closes. This energizes relay CR16. Contacts CR16B open and contacts CR16C close. Relay CR14 is dropped out of circuit with the opening of contacts CR16B. As a consequence, contacts CR14A open and CR14C close to establish the normal speed setting for the travel motor. Contacts CR14B and CR14D are opened to stop return travel. With the closing of contacts CR16C, the weld circuit can be reestablished.

When the rotation return finished, limit switch element LS6A closes to energize relay CR17. With the energization of relay CR17, contacts CR17B open to deenergize relay CR15. As a consequence, contacts CR15A and CR15C open and close, respectively, and contacts CR15B and CR15D open. The original control speed setting is therefore reestablished for rotation motor 66 and rotation stops.

What is claimed is:

1. A welding machine for applying hard facing to a workpiece in a plane around an end thereof on a first straight edge, and arc-shaped edge which meets the first straight edge, and a second straight edge which meets the arc-shaped edge comprising:

a. a base;

b. a table mounted for translation on the base;

c. means to translate the table during a first and a third predetermined time interval an amount corresponding to the length of the first and second straight edges respectively;

d. means to terminate table translation at the end of the first predetermined time interval;

e. means for mounting the workpiece to translate with the table such that the plane of the workpiece edges to be hard faced is parallel to the direction of translation;

f. means to rotate the workpiece in the plane of the edges during a second predetermined time interval beginning at the end of the first predetermined time interval an amount corresponding to the length of the arc-shaped edge;

g. means to terminate workpiece rotation at the end of the second predetermined time interval;

h. means to initiate table translation for the third predetermined time interval beginning at the end of the second predetermined time interval;

i. means for mounting a welding torch in position to hard face the translating and rotating workpiece along the edges thereof to be hard faced; and j. a weld rod feed assembly on the base including means to advance a weld rod of hard facing material into a welding zone created by the welding torch, the weld rod feed assembly including:
   i. a carriage on the base;
   ii. a slide on the carriage;
   iii. means to advance and retract the slide towards and away from the welding zone;
   iv. means on the slide to selectively clamp the weld rod during the slide's advance; and
   v. means on the carriage to selectively clamp the weld rod during the slide's retraction.

2. The welding machine claimed in claim 1 including means for mounting a master cam for translation and rotation with the workpiece, and wherein the carriage is pivotally mounted to the base and has a cam follower for riding on the master cam to adjust the carriage's position relative to the workpiece, the torch mounting means being on the carriage.

3. The welding machine claimed in claim 1 including:
means to return the table to the position it was in at the outset of the first translation after the termination of the second translation; and
means to rotate the workpiece mounting means back to the rotational position it was in at the outset of rotation after the termination of the second translation.

4. The welding machine claimed in claim 1 wherein the workpiece mounting means includes:

a. a jig having a bearing surface;

b. a clamp having a complementary bearing surface; and c. means to apply a clamping force through the bearing surfaces on a workpiece.

5. The welding machine claimed in claim 4 wherein the clamping force application means includes a pin secured in the jig and passing through the jig's bearing surface, and means in the clamp to detachedly secure the pin and apply a biasing force acting through the clamp's bearing surface on a workpiece.

6. A welding machine capable of applying hard facing to relatively narrow workpieces comprising:

a. a base;

b. a table;

c. means mounting the table to the base for translation thereon;

d. drive means for translating the table on the base;

e. a jig mounted for rotation on the table having means for receiving a workpiece;

f. drive means for rotating the jig;

g. a clamp having means for cooperating with the receiving means of the jig to secure a workpiece between the jig and the clamp;

h. means for mounting a welding torch in position to weld a workpiece as the workpiece translates and rotates with respect to the welding torch;

i. means for advancing a weld rod into a welding zone for the application of the weld rod material to a workpiece;

j. means to initiate a first translation of the table in a prescribed direction;

k. means to terminate the first translation at a predetermined point of translation;

l. means to initiate rotation of the jig in a prescribed direction after the first translation terminates;

m. means to terminate rotation of the jig at a predetermined point of rotation;

n. means to initiate a second translation of the table in a prescribed direction after the rotation terminates;

o. means for mounting a master cam having a profile corresponding to the weld profile of a workpiece for translation and rotation with the jig; and p. a carriage having a cam follower disposed to track on the master cam, the carriage mounting the welding torch mounting means and the weld rod advancing means and being responsive to the master cam to maintain a predetermined position of the welding torch and weld rod relative to the workpiece.

7. The welding machine claimed in claim 6 wherein the weld rod advancing means includes:

a. a slide mounted on the carriage for translation towards and away from the welding zone;

b. clamping means on the slide for selectively clamping the weld rod during translation of the slide towards the welding zone;

c. clamping means on the carriage for selectively clamping the weld rod during translation of the slide away from the welding zone; and d. a drive selectively operable to translate the slide towards and away from the welding zone.

8. The welding machine claimed in claim 7 including means for deactivating the weld rod clamping means on the slide and for activating the weld rod clamping means on the carriage at a predetermined point during the translation of the slide away from the welding zone.

9. The welding machine claimed in claim 8 wherein the jig has a bearing surface for bearing against one side of a workpiece, a pin secured in the jig and extending from the bearing surface thereof is provided, and the clamp has a bearing surface for bearing against the other side of the workpiece and means for applying a clamping force on the workpiece through the bearing surfaces of the jig and clamp acting through the pin.

10. The welding machine claimed in claim 9 wherein the pin has a head of larger diameter than the portion of the pin adjacent the head to define a shoulder of the head, the clamp has a collet adapted to selectively receive the pin by engaging the head at the shoulder thereof, and spring means is provided to bias the collet in a direction to apply tension on the pin and the bearing surface of the clamp in compression against the workpiece.

11. The welding machine claimed in claim 10 wherein the jig has an alignment pin adjacent to and extending away from the jig's bearing surface towards the clamp, and the clamp has a boss adapted to abut the alignment pin when the clamp is properly oriented with respect to the jig, the alignment pin being disposed away from the position of the periphery of the workpiece to be welded and in position to determine the correct rotational orientation of the workpiece when the workpiece abuts the alignment pin.

12. The welding machine claimed in claim 1 including:

a. means to return the table to the position it was in at the outset of the first translation after the termination of the second translation; and b. means to rotate the jig back to the rotational position it was in at the initiation of rotation after the termination of the second translation.

PO-1050
(5/69)

UNITED STATES PATENT OFFICE
CERTIFICATE OF CORRECTION

Patent No. 3,619,545          Dated November 9, 1971

Inventor(s)        Rolland Ernest Borden

It is certified that error appears in the above-identified patent and that said Letters Patent are hereby corrected as shown below:

In the specification: Column 4, line 31, at end of line "a" should be --an--; line 53, "shift" should be --shaft--. Column 6, line 49, "leas" should be --lead--; line 74, after "faced" insert the following sentence --The welding circuit is completed through the electrode of torch 20.--. Column 8, line 53, delete the entire line "while the armature is indicated by reference numeral 338,". Column 10, line 18, "400" should be --140--. Column 12, line 62, "finished" should be --finishes- In the claims: Claim 1, column 12, line 72, "and arc-shaped" should be --an arc-shaped--. Claim 12, column 14, line 69, "1" should be --6--.

Signed and sealed this 11th day of July 1972.

(SEAL)
Attest:

EDWARD M. FLETCHER, JR.        ROBERT GOTTSCHALK
Attesting Officer               Commissioner of Patents